United States Patent Office 3,084,198
Patented Apr. 2, 1963

3,084,198
PROCESS FOR PREPARING PARA-t-ALKYL
THIOPHENOLS USING BF$_3$ AS CATALYST
Martin B. Neuworth, Pittsburgh, Pa., and Eric B. Hotelling, Westport, and Edward A. Bartkus, Stamford, Conn., assignors to Consolidation Coal Company, Pittsburgh, Pa., a corporation of Pennsylvania
No Drawing. Filed Nov. 21, 1960, Ser. No. 70,413
26 Claims. (Cl. 260—609)

This invention relates to t-alkylated thiophenols and processes for preparing them. More particularly, it relates to a process whereby para-t-alkyl thiophenols are prepared by direct alkylation of a thiophenol in the presence of boron trifluoride as catalyst. This invention further relates to the preparation of t-alkyl aryl sulfides and t-alkyl p-t-alkaryl sulfides and their conversion to para-t-alkyl thiophenols in the presence of boron trifluoride as catalyst.

The problems involved in the direct alkylation of thiophenols are well known. As has been pointed out in U.S. Patent 2,753,378:

"In contrast with phenolic compounds, which are simply alkylated to produce alkyl phenols, previous efforts to alkylate thiophenols have resulted in alkylation exclusively of the sulfur atom with the resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attempted alkylation of thiophenols has also been complicated by the fact that common alkylating catalysts such as anhydrous aluminum chloride and concentrated sulfuric acids have tended to cause desulfurization and condense ring formation at relatively mild operating conditions.

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride. Primary and secondary alcohols are considered unsuitable as alkylating agents in that sulfur-alkylated products are reported to be produced exclusively. In this method of the prior art using the specified t-alkylating agents, the ring-alkylated, i.e., C-alkylate product, is reported as being formed in a yield that is low compared with yields obtained by the process of this invention, with relatively large amounts of the sulfide, i.e., S-alkylate product, being formed. Further, to obtain the C-alkylate compound using the specific alkylating agent required with the process, i.e., the tertiary alcohol or tertiary mercaptan, an additional hydrolysis step is required; the alkylating agents used are also relatively expensive, and, because of the hydrolysis step, the aluminum halide catalyst present is consumed in the reaction or is otherwise not recoverable.

It is accordingly an object of the present invention to provide a method, free from the disadvantages of known methods for directly alkylating a thiophenol in the para position of the ring.

It is a further object to provide a method for t-alkylating a thiophenol to a C-alkylated thiophenol substantially free from S-alkylated products.

It is still a further object to provide a method for converting alkyl aryl sulfides to ring-alkylated thiophenols.

It is an additional object to provide alkylated thiophenols, including novel t-alkyl p-t-alkaryl sulfides.

In accordance with this invention, an alkylatable thiophenol containing meta and para positions that are "free," i.e., unsubstituted by other than a hydrogen atom, is converted to a para-t-alkyl thiophenol in substantial yield by reacting it with a t-alkyl-generating olefinic alkylating agent in the presence of boron trifluoride as catalyst under ring alkylating conditions so that there occurs substantial substitution by the tertiary alkyl group in the para position. The olefin used must generate a tertiary alkyl substituent. Preferred olefinic alkylating agents are those which additionally contain from 4 to 12 carbon atoms and have one double bond per molecule. Of course an alkylating agent that yields water as a reaction product, such as an aliphatic alcohol, would inactivate the boron trifluoride catalyst and thus be unsuitable for the practice of this invention.

Further, in accordance with this invention, any S-alkylate products formed during the alkylation reaction, e.g., sulfides, may be disproportionated or rearranged to form t-alkyl substituted C-alkylate product by further reaction of the S-alkylate product in the presence of boron trifluoride as catalyst. Optionally, additional quantities of the starting thiophenol may be added. By either technique, all S-alkylate product may be converted to C-alkylate product. Effectively, then, the S-alkylate compound acts as an alkylating agent, ring alkylating some of the added thiophenol or another sulfide molecule. At the same time, the S-alkylate product may undergo internal rearrangement to a C-alkylate product.

The terms "alkylation" or "alkylating" as used herein, unless otherwise indicated, are directed to the substitution of a tertiary alkyl hydrocarbon radical for a hydrogen atom in the para position of a thiophenolic compound. The term "C-alkylation" is specific to substitution in the ring, and "S-alkylation" refers to substitution of the hydrogen atom attached to the sulfur atom to form an alkyl aryl sulfide.

The alkylatable thiophenolic compounds that are employed as starting materials in the process of this invention contain hydrogen atoms in the meta positions in addition to containing a hydrogen atom in the para position with respect to the sulfhydryl or thiol group present on the benzene nucleus. Problems of steric hindrance will ordinarily occur when an attempt is made to substitute a group onto the ring in a position adjacent to another group already on the ring. Thus the presence of a methyl or other alkyl group in a meta position will prevent para-alkylation from occurring even though the para position is free, i.e., unsubstituted by other than hydrogen. Thiophenol homologs that may be advantageously employed in the process of this invention include, for example, o-thiocresol, o-ethylthiophenol, 2,6-thioxylenol, o-n-butylthiophenol, 2,6-diisopropylthiophenol, o-n-hexylthiophenol, and o-chlorothiophenol. In general, thiophenol itself and thiophenol substituted only by lower alkyl radicals ($C_1$ to $C_5$) are preferred as alkylatable starting materials. These preferred alkylatable thiophenols are unsubstituted by other than hydrogen in the 3, 4, and 5 positions on the ring.

Suitable t-alkyl-generating olefinic alkylating agents that may be used for obtaining substitution in the para position of the ring include isobutylene, isoamylene, propylene trimer, propylene tetramer, and diisobutylene. In general, t-alkyl-generating unsaturated aliphatic hydrocarbons having from 4 to 12 carbon atoms, e.g., various olefins and olefin polymers, are suitable and preferred for the practice of this invention.

It is considered an essential feature of this invention that boron trifluoride be used as catalyst together with a t-alkyl-generating olefin to effect the direct ring-alkylation reaction in the para position and also to effect the conversion of S-alkylate product to C-alkylate product. It should be noted that while other so-called acid-type catalysts such as sulfuric acid, phosphoric acid, and ferric chloride, as well as boron trifluoride, are extremely effective for ring-alkylating phenols, using catalyst concentration as low as 0.2 percent by weight, these aforementioned other catalysts are essentially ineffective for the ring alkylation of thiophenols or for converting S-alkylate compounds to C-alkylate ones. Thus for alkylation of thiophenols, so-called conventional alkylation catalysts are not substitutive for each other.

For obtaining substantial ring alkylation, the boron trifluoride should be present in at least a saturating amount. This represents the amount of boron trifluoride, at a given pressure, that is in equilibrium between the liquid and vapor phases of the reactant materials present. An amount of 5–10 percent of boron trifluoride, based on the original weight of the thiophenol, is generally preferred, although amounts of catalyst between 2 and 25 percent are considered suitable. It is further preferred, in order to conserve the supply of boron trifluoride catalyst used and in order to increase the rate of conversion of thiophenol to C-alkylate product, that the reaction be carried out in a closed system at above atmospheric pressure and at an elevated temperature. Temperatures between 50 and 150° C. are considered suitable for the reaction, with a temperature between 80 and 100° C. being preferred.

The process disclosed herein is particularly advantageous for commercial exploitation inasmuch as the alkylated thiophenol may be completely converted to the para C-alkylate product with no S-alkylate product present. Thus when an alkylatable thiophenol containing hydrogen atoms in meta and para positions is alkylated in accordance with this invention, para C-alkylate and S-alkylate products are formed. Means have now been provided, without basically changing the reactants or catalyst system employed, for further converting the S-alkylate products to the para C-alkylate products. This is accomplished by reacting the sulfides with additional portions of the starting thiophenol in the presence of at least a saturating amount of boron trifluoride as catalyst. Furthermore, where t-alkyl aryl sulfides are used as starting materials, independent of how produced, means have now been provided for converting them to ring-alkylated thiophenols while simultaneously using them as ring-alkylating agents for thiophenols added thereto. The alkyl group must be a t-alkyl group in order to be directed to the para position.

In general, in the direct alkylation step, if less than a mole of alkylating agent per mole of alkylatable thiophenol is used, increased formation of the C-alkylate product is favored. A molar ratio of 0.25–0.75 to 1 of alkylating agent to thiophenol is preferred for this purpose. The S-alkylate product generally consists of the t-alkyl aryl sulfide and also of the t-alkyl p-t-alkaryl sulfide. The formation of the latter sufide is favored when a molar excess of alkylating agent is used. The conversion of the sulfides may be carried out at atmospheric pressure or at greater than atmospheric pressure and at a temperature between 50 and 150° C. A temperature between 80 and 100° C. is considered optimal. The boron trifluoride present may vary from 2 to 25 percent by weight of the thiophenol added. Amounts from 5 to 10 percent are preferred.

Without being restricted by the reaction mechanism to be suggested, it is believed that reaction of the t-alkyl aryl sulfide under alkylating conditions primarily results in the isomerization of the sulfide both on an inter- and intramolecular basis. That is, the t-alkyl group attached to the sulfur atom may migrate to the para position of its own molecule, where this position is free, and also to that of another reactant molecule thereby forming a C-alkylate derivative. Although thiophenol may be added to the t-alkyl aryl sulfide the isomerization can occur wholly independent of the amount of any added thiophenol (reaction 2).

However, reaction of a t-alkyl p-t-alkaryl sulfide under alkylating conditions requires addition of a thiophenol to yield p-t-alkyl thiophenol (reaction 3) inasmuch as the extra t-alkyl group requires an acceptor since the para position of the aryl radical of the sulfide is occupied. Of course in actual practice both reactions 2 and 3 will occur simultaneously. The t-alkyl p-t-alkaryl sulfide also can be converted to the desired p-t-alkyl thiophenol by selective cleavage of the S-t-alkyl group.

In accordance with this invention, thiophenol and o-alkyl substituted thiophenols may be directly alkylated in the para position of the ring using a t-alkyl generating olefin or a t-alkyl aryl sulfide as alkylating agent. Where the para position of the thiophenol is substituted, no t-alkylation can occur on the ring even where the ortho and meta positions are free. For example, stoichiometric amounts of p-thiocresol and its t-butyl sulfide were reacted together under optimum rearrangement conditions. An amount of approximately 10% boron trifluoride was used and the run was conducted for four hours at 80° C. No reaction was found to occur, the starting materials being recovered substantially unchanged. Similarly, when p-thiocresol was reacted with diisobutylene, no ring alkylation occurred, only t-butyl p-tolyl sulfide being formed.

The alkylated thiophenols, both C-alkylated and S-alkylated, find a variety of uses. Several of these compounds or their metallic salts are of interest as lubricating oil additives because of their antioxidant and detergent properties. As antioxidants, they serve to prevent resin formation in fuels; condensed to form thioacetals, they are particularly suited as additives for high-pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds, e.g., t-butyl p-t-butylphenyl sulfide, nonyl phenyl sulfide, and nonyl p-nonylphenyl sulfide, are seen as possessing useful insecticidal properties in addition to being useful as ready sources for the production of the corresponding thiophenols.

In addition, compounds such as the p-t-butylthiophenols are particularly useful as substantially odorless rubber peptizers. Thus, while o-thiocresol possesses peptizing properties, compounds such as 4-t-butyl-o-thiocresol and 4-t-butyl-2,6-thioxylenol may be used as rubber peptizers, and at the same time are free from the sickeningly repugnant odor characterizing o-thiocresol. A higher molecular weight compound such as p-nonylthiophenol is seen as affording similar peptizing advantages in this regard. The metal salt or phosphate ester of p-nonylthiophenol is considered suitable as an antioxidant lubricating oil additive.

The process of this invention is advantageously employed to prepare para-t-butyl thiophenols directly from thiophenol or its homologs. Typical C-alkylate and S-alkylate products that may be formed by direct butylation of thiophenol are the following:

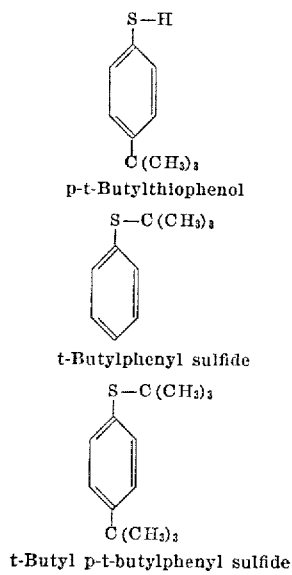

p-t-Butylthiophenol t-Butylphenyl sulfide t-Butyl p-t-butylphenyl sulfide

For purposes of illustration, without limiting the scope of this invention, the process of the invention will be particularly described with reference to the conversion of thiophenol to p-t-butylthiophenol. The following reactions, shown schematically and not stoichiometrically, illustrate the manner in which conversion of thiophenol to p-t-butylthiophenol may be obtained.

REACTION 1.—DIRECT t-BUTYLATION OF THIOPHENOL

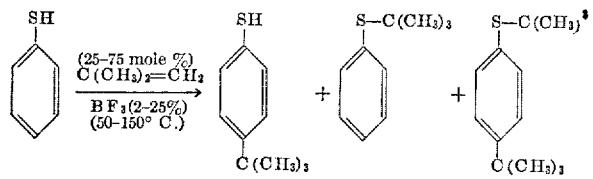

REACTION 2.—ISOMERIZATION OF t-BUTYL PHENYL SULFIDE

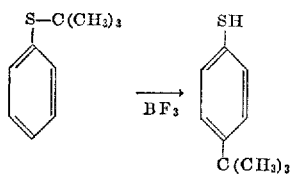

REACTION 3.—DISPROPORTIONATION OF t-BUTYL p-t-BUTYLPHENYL SULFIDE

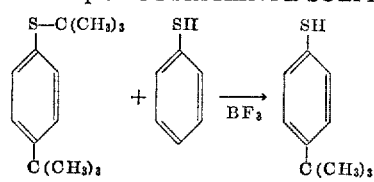

It is noted that in accordance with the above three reactions, the final product obtained is either p-t-butylthiophenol or converible thereto.

*Example 1.—Direct Butylation (5 Percent BF₃ Catalyst)*

In accordance with reaction 1, 165 grams (1.5 moles) of thiophenol was charged into a 300-ml. rocker-type bomb. Fifty mole percent (43 g., 0.75 mole) of isobutylene was added thereto, using as catalyst 8.5 grams boron trifluoride (5 percent based on the weight of the thiophenol). The reaction was carried out at a temperature of 120° C. for a period of two hours at a pressure of 300–400 pounds per square inch. Thirty percent conversion was obtained based on the weight of thiophenol, or 58 percent conversion based on the isobutylene used. About 70 percent of the converted material was p-t-butylthiophenol. Most of the balance consisted of higher-boiling material, primarily t-butyl p-t-butylphenyl sulfide, with also some t-butyl phenyl sulfide being formed.

*Example 2.—Direct Butylation (2 Percent BF₃ Catalyst)*

An amount of 3,020 grams (27.6 moles) of thiophenol containing a slight quantity of neutral oils was charged into a 6-liter stainless steel stirrer-equipped autoclave. Approximately 60 grams of boron trifluoride, or 2 percent, based on the weight of thiophenol charged, was added at a pressure of 25 pounds per square inch, the boron trifluoride being cooled during the period of addition. A tank of isobutylene was heated to a pressure of 60 pounds per square inch, and the isobutylene was then forced into the autoclave reactor, water being run through surrounding cooling coils to keep the temperature and pressure from rising. An amount of 2½ pounds of isobutylene was added, which corresponded to the molar quantity of thiophenol used.

The reactants were held at 80° C. for two hours while being stirred. The autoclave was than allowed to cool to room temperature, the gases present were vented, and the autoclave was drained. Water was added to the drained material, which was then alternately washed with sodium bicarbonate and water in the presence of added toluene, the latter serving to prevent emulsion formation. Water present was then removed by azeotropic distillation, and the product was distilled in a Vigreaux column. The following materials were obtained, the yields being calculated on the original charge of thiophenol:

| | |
|---|---|
| Thiophenol | 987 grams (32.5%). |
| t-Butyl phenyl sulfide | 326 grams (7%). |
| p-t-Butylthiophenol | 2,081 grams (45.5%). |
| t-Butyl p-t-butylphenyl sulfide | 581 grams (9.5%). |
| High boiling residue, principally disulfides | 110 grams. |

PROOF OF STRUCTURE OF p-t-BUTYLTHIOPHENOL

The material identified in Examples 1 and 2 as p-t-butylthiophenol was compared with an authentic sample of p-t-butylthiophenol prepared by the method described in Organic Syntheses, coll. vol. I, pp. 85 and 504, as follows:

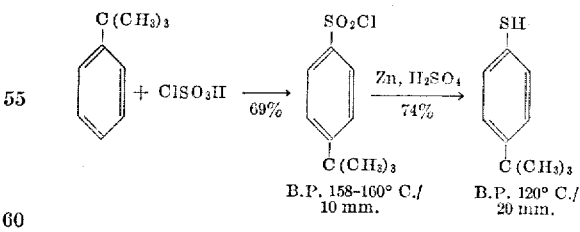

B.P. 158–160° C./ 10 mm.    B.P. 120° C./ 20 mm.

The authentic sample assayed 97% minimum by thiol titration and boiled at the same point as that produced by butylation of thiophenol (120° C./20 mm.).

Air oxidation of the authentic and test samples with ammonia as catalyst produced disulfides, M.P. 88.5–89.5° C.; mixed melting point was not depressed. Condensation of the t-butylbenzene-derived sample of p-t-butylthiophenol with 2,4-dinitrochlorobenzene and sodium hydroxide produced a solid derivative, M.P. 130–131° C. after recrystallization from isopropyl alcohol. The same derivative from the experimental test samples of p-t-butylthiophenol melted at 130.5–131.5° C. after recrystallization from isopropyl alcohol. The mixed melting point of the two derivatives was 130.2–131.5° C. Moreover, the two samples of p-t-butylthiophenol had identical infrared spectra. The preparation of the derivative is shown in the following reaction:

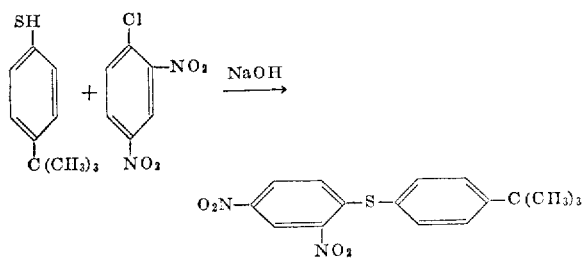

*Example 3.—Preparation of t-Butyl p-t-Butylphenyl Sulfide*

In order to increase the yield of t-butyl p-t-butylphenyl sulfide that was formed in accordance with reaction 1, the reaction between thiophenol and isobutylene was carried out using a molar excess of isobutylene, and at atmospheric pressure at a temperature of 120° C. The reaction time was two hours. Ninety-six percent of the thiophenol was converted. The following products were identified, the yields reported being based on the weight of converted material:

| | Percent |
|---|---|
| t-Butyl p-t-butylphenyl sulfide | 53.5 |
| t-Butyl phenyl sulfide | 31.5 |
| p-t-Butylthiophenol | 5 |
| Residue and losses | 10 |

The t-butyl p-t-butylphenyl sulfide was recrystallized from hexane as white crystals, insoluble in dilute caustic, having a melting point of 49.5–51° C. Its boiling point was 132° C. at a pressure of 10 millimeters mercury. Infrared analysis served to confirm the structure of the compound. Its purity and identity were confirmed by elementary analysis as follows:

*Analysis.*—Calculated (for $C_{14}H_{22}S$; mol. wt.=222.4): C, 75.61; H, 9.97; S, 14.41. Found: C, 75.23; H, 10.01; S, 14.25.

*Example 4.—Conversion of t-Butyl Phenyl Sulfide (Reaction 2)* t-Butyl phenyl sulfide was separated from a portion of S-butylated product formed in accordance with reaction 1, and was reacted on an equimolar basis with thiophenol in a rocking bomb at a pressure of 400 pounds per square inch for four hours at 120° C. Ten percent of boron trifluoride, based on the weight of t-butyl phenyl sulfide, was used as catalyst. Nearly all of the t-butyl phenyl sulfide was converted. Yields were obtained, based on the t-butyl phenyl sulfide charged, of p-t-butylthiophenol in an amount of 64 percent and of isobutylene in an amount of 17½ percent.

For the same reactant ratios and catalyst concentration, but at a temperature of 80° C. for one hour, a 71 percent yield of p-t-butylthiophenol was obtained. At 80° C. for four hours, the yield obtained was 75 percent.

In accordance with the reaction mechanism previously discussed, it is believed that an actual disproportionation of the t-butyl phenyl sulfide occurred in Example 4 in addition to a rearrangement of the t-butyl group from the sulfur atom to the para carbon atom of the ring on the same molecule. The t-butyl group is seen as splitting off from t-butyl phenyl sulfide and adding to thiophenol to form p-t-butylthiophenol. This mechanism is consistent with the observation that varying the amount of thiophenol present results in a yield of p-t-butylthiophenol almost in direct relation to the amount of thiophenol present.

The foregoing process of disproportionating and rearranging an alkyl aryl sulfide is, of course, applicable independent of the manner in which the alkyl aryl sulfide compound is formed. Thus, t-butyl phenyl sulfide and nonyl phenyl sulfide produced by sulfuric acid catalysis, as shown in Example 5 were found entirely suitable for disproportionation to form p-t-butylthiophenol and p-nonylthiophenol, respectively.

*Example 5.—Sulfuric Acid-Catalyzed Preparation of Sulfides and Their Conversion*

(a) *t-Butyl phenyl sulfide.*—An almost complete conversion of thiophenol to t-butyl phenyl sulfide was obtained by reacting thiophenol with a slight molar excess of isobutylene in the presence of an amount of 75 percent sulfuric acid equal in weight to the thiophenol reacted. This high conversion was obtained by using a closed pressure system at room temperature. The t-butyl phenyl sulfide obtained was converted to p-t-butylthiophenol in accordance with the process of Example 4.

(b) *Nonyl phenyl sulfide.*—Equimolar amounts of thiophenol and Atlantic technical nonene (propylene trimer) were treated with 10 percent by weight of concentrated sulfuric acid catalyst (based on thiophenol) and heated to 50° C. with stirring. After six hours the heating was discontinued, and the reaction mixture was neutralized, extracted with toluene, and distilled. The yield of nonylphenyl sulfide, B.P. 147° C./10 mm., based on the thiophenol reacted, was 52.5 percent.

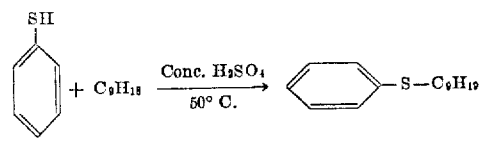

The nonyl phenyl sulfide was readily converted to p-nonylthiophenol by treatment with thiophenol in the presence of boron trifluoride as catalyst. The identities of the nonyl phenyl sulfide and of the p-nonylthiophenol were confirmed by infrared analysis.

*Example 6.—Conversion of t-Butyl p-t-Butylphenyl Sulfide*

In accordance with reaction 3, t-butyl p-t-butyl-phenyl sulfide (257 g., 1.16 moles) obtained according to Example 3 was reacted with a molar excess of thiophenol (208 g., 1.89 moles) in a system maintained at atmospheric pressure at a temperature of 120° C. The reaction was run for two hours, during which period boron trifluoride was bubbled through the reaction system. p-t-Butylthiophenol was obtained in high yield (58.5 percent, based on t-butyl p-t-butylphenyl sulfide) together with smaller amounts of t-butyl phenyl sulfide and of the starting materials.

*Example 7.—t-Butylation of Ortho-Thiocresol*

Ortho-Thiocresol was reacted with isobutylene at atmospheric pressure at a temperature of 100° C. for a period of two hours, boron trifluoride being bubbled through the reaction mixture. 4-t-butyl-o-thiocresol was obtained in low yield. o-Thiocresol was also butylated at greater than atmospheric pressure. Into a 300-ml. rocking type bomb was charged 107 grams of o-thiocresol, 54 grams of isobutylene, and 10 grams of boron trifluoride catalyst. After shaking at room temperature, the pressure was 175 pounds per square inch gage. The bomb was then heated to 80° C. at a pressure of 325 pounds per square inch gage and held at 80° C. for six hours. The bomb was then cooled to room temperature overnight, under pressure, and the reaction products were removed and extracted with caustic. The caustic solution was neutralized, toluene was added, and water present was removed by azeotropic distillation. The recovered material was then fractionally distilled in a ¾-inch diameter Vigreaux column. Recovery of o-thiocresol was 31 grams, or 29 percent based on the o-thiocresol charged. The yield of the 4-t-butyl-o-thiocresol was 60 grams, or 38 percent based on the o-thiocresol charged. The remainder of the material consisted of residue containing some of the t-butyl sulfide and disulfide derivative, caustic-insoluble, and loss.

The 4-t-butyl-o-thiocresol had a boiling point of 117° C. at 10 mm. pressure. Its structure was confirmed by infrared analysis. A derivative was prepared from the 4-t-butyl-o-thiocresol by reacting it with 2,4-dinitrochlorobenzene in the presence of sodium hydroxide. The derivative was a yellow powder which was recrystallized from isopropyl alcohol. Its melting point after recrystallization was between 140.5 and 142.5° C.

*Example 8.—Preparation of 4-t-Butyl-2,6-Thioxylenol*

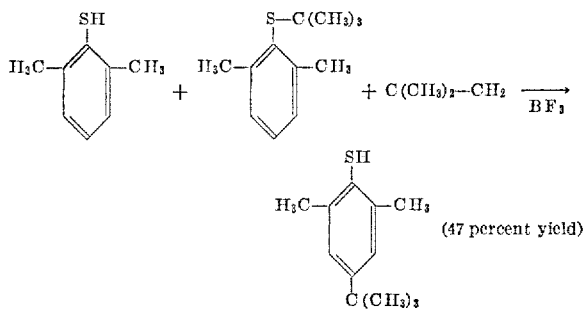

A run was made in which 2,6-thioxylenol was butylated while simultaneously its t-butyl sulfide was disproportionated. The t-butyl 2,6-xylyl sulfide used had previously been prepared by a sulfuric acid-catalyzed reaction of 2,6-thioxylenol with isobutylene.

Into a 300-ml. bomb were charged 51 grams of 2,6-thioxylenol, 45 grams of t-butyl 2,6-xylyl sulfide, 57 grams of isobutylene, and 10 grams of boron trifluoride catalyst. Upon mixing in the bomb, the temperature rose from room temperature to 45° C. After being rocked for one half hour, the temperature fell to 27° C. at a pressure of 200 pounds per square inch gage. The bomb was then heated to 80° C., attaining a pressure of 290 pounds per square inch gage, and maintained at this temperature for two hours. The bomb was then cooled to room temperature overnight under pressure, and worked up in the usual manner, namely, by caustic extraction, neutralization, toluene addition, azeotropic distillation to remove water, and fractional distillation in a Vigreaux column. The yield obtained of 4-t-butyl-2,6-thioxylenol was 55 grams, or 47 percent based on the theoretical yield of 4-t-butyl-2,6-thioxylenol obtainable as determined from the total number of moles of t-butyl 2,6-xylyl sulfide and isobutylene charged to the reaction vessel. A small amount, a few percent, of 2,6-thioxylenol was recovered. The residue was either caustic-insoluble material or loss.

The 4-t-butyl-2,6-thioxylenol obtained had a boiling point of 126° C. at a pressure of 10 mm. Its structure was confirmed by infrared spectral analysis. A derivative thereof was prepared by treating it with 2,4-dinitrochlorobenzene in the presence of sodium hydroxide. The derivative was a yellow powder that was recrystallized from isopropyl alcohol. After recrystallization, it had a melting point between 192 and 193° C.

Butylation of 2,6-thioxylenol by reaction only with isobutylene in the presence of boron trifluoride as catalyst, or disproportionation of t-butyl 2,6-xylyl sulfide in the absence of isobutylene with boron trifluoride as catalyst, may also be readily achieved.

*Example 9.—Preparation of p-Nonylthiophenol*

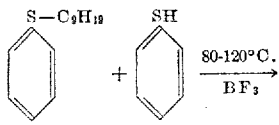

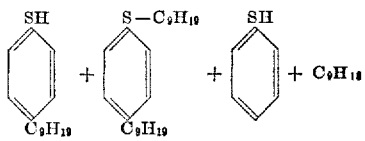

Nonyl phenyl sulfide was prepared by a sulfuric acid-catalyzed reaction of thiophenol with nonene (propylene trimer), as shown in Example 5b. To 118 g. (0.5 mole) of the sulfide in a 300-ml. stainless steel rocking bomb were added 55 g. (0.5 mole) of thiophenol (94%, technical) and 12 g. (10% by wt. of nonyl phenyl sulfide) of $BF_3$ as catalyst. The reaction mixture was heated at 120° C. for 4 hours and allowed to cool under pressure. The resultant product was then caustic-extracted, neutralized, treated with toluene, dried azeotropically, and distilled. The yield of p-nonyl-thiophenol, B.P. 158–162° C. at 10 mm., based on the initial sulfide charge, was about 47 g. (40 percent). About 27 g. of nonyl phenyl sulfide was recovered (23 percent). Thiophenol, nonene, and nonyl p-nonylphenyl sulfide were also recovered.

Repetition of the run at 80° C., using similar reactant proportions, lowered the yield of p-nonylthiophenol to 25 percent. In a run at 100° C. the yield was increased to 35 percent. Thus higher temperatures than are optimal with t-butyl phenyl sulfide appear desirable.

The p-nonylthiophenol formed a soapy solution in caustic which had detergent and foam-stabilizing properties; the material is further useful as a rubber peptizer. Its but faint odor makes it of additional commercial importance in this regard. The structure of the p-nonyl-thiophenol and of the nonyl p-nonylphenyl sulfide were confirmed by infrared spectral analysis.

*Example 10.—Reaction of Thiophenols With Diisobutylene*

Thiophenol was reacted with an equimolar amount of diisobutylene at atmospheric pressure at a temperature of 100° C., with boron trifluoride being bubbled through continuously for a period of two hours to saturate the reactants. Sixty-nine percent of the thiophenol was converted. p-t-Butylthiophenol was obtained in 53 percent yield, based on the material converted. t-Butyl phenyl sulfide was present in 10.5 percent yield. Other products obtained included t-butyl p-t-butylphenyl sulfide and an oil believed to be octyl phenyl sulfide, both boiling at 132° C. at a pressure of 10 mm. mercury. A product believed to be p-octylthiophenol was also obtained.

Equimolar amounts of o-thiocresol and diisobutylene were reacted in a bomb in the presence of 5 percent boron trifluoride (based on the o-thiocresol). The reaction was run at a temperature of 120° C. for three hours. 4-t-butyl-o-thiocresol was obtained in low yield.

Obviously, many modifications and variations of the invention, as hereinbefore set forth, may be made without departing from the spirit and scope thereof, which are primarily directed to the direct alkylation of an alkylatable thiophenol in the para position in the presence of boron trifluoride as catalyst. The examples given, therefore, should be considered only illustrative of the invention, its scope being determined in accordance with the objects thereof and the appended claims.

This application is a continuation-in-part of our co-pending application Serial No. 716,853, filed February 24, 1958.

We claim:

1. The process for preparing para-alkyl thiophenols which comprises alkylating an alkylatable thiophenol containing hydrogen atoms in meta and para positions with a monoolefinic hydrocarbon selected from the group consisting of isobutylene, diisobutylene, and nonene in the presence of boron trifluoride as catalyst at ring alkylating conditions so that substantial carbon alkylation in the para position occurs.

2. The process for preparing para-t-butyl thiophenols which comprises reacting a thiophenol containing hydrogen atoms in meta and para positions with isobutylene in the presence of boron trifluoride as catalyst so that substantial t-butylation in the para position occurs.

3. The process for preparing para-t-butylthiophenol which comprises reacting thiophenol with isobutylene in the presence of boron trifluoride as catalyst so that substantial t-butylation in the para position occurs.

4. The process according to claim 3 wherein a molar excess of thiophenol is reacted with isobutylene.

5. The process according to claim 3 wherein the reaction is carried out at greater than atmospheric pressure at a temperature between 50 and 150° C., boron trifluoride being present in at least a saturating amount of between 2 and 2.5 percent by weight of the starting thiophenol.

6. The process according to claim 3 wherein the reaction is maintained at a temperature between approximately 80 and 100° C., the boron trifluoride being present in an amount of between 5 and 10 percent by weight of the starting thiophenol.

7. The process of substituting the hydrogen atom in the para position of a thiophenol by a tertiary alkyl group and obtaining substantially all C-alkylate product which comprises reacting a thiophenol containing hydrogen atoms hydrogen atoms in meta and para position with a thio- in meta and para positions with a monoolefinic hydrocarbon containing from 4 to 12 carbon atoms, and in which the alkyl substituent formed is a tertiary alkyl group, effecting said reaction in the presence of boron trifluoride as catalyst so that the reaction product obtained includes substantial amounts of para-C-alkylate product in addition to S-alkylate, and reacting the S-alkylate product in the presence of boron trifluoride as catalyst to form para-C-alkylate product.

8. The process of substituting the hydrogen atom in the para position of a thiophenol by a tertiary alkyl group and obtaining substantially all C-alkylate product which comprises reacting a thiophenol containing hydrogen atoms in meta and para positions with a monoolefinic hydrocarbon containing from 4 to 12 carbon atoms, and in which the alkyl substituent formed is a tertiary alkyl group, effecting said reaction in the presence of boron trifluoride as catalyst so that the reaction product obtained includes substantial amounts of para-C-alkylate product in addition to S-alkylate, and reacting the S-alkylate product and additional portions of said thiophenol in the presence of boron trifluoride as catalyst to form para-C-alkylate product.

9. The process for t-butylating thiophenol to yield p-t-butylthiophenol which comprises reacting thiophenol with isobutylene in the presence of boron trifluoride as catalyst so that the reaction product obtained includes substantial amounts of p-t-butylthiophenol in addition to sulfide selected from the group consisting of t-butyl phenyl sulfide, t-butyl p-t-butylphenyl sulfide and mixtures thereof, and reacting said sulfide with additional portions of thiophenol in the presence of boron trifluoride as catalyst to form p-t-butylthiophenol.

10. The process for preparing para-alkyl thiophenols which comprises reacting a t-alkyl aryl sulfide in which the aryl radical contains hydrogen atoms in meta and para positions in the presence of boron trifluoride as catalyst to produce substantial amounts of para-C-alkylated thiophenol.

11. The process for preparing para-alkyl thiophenols which comprises reacting a t-alkyl para-alkaryl sulfide and a thiophenol containing hydrogen atoms in meta and para positions in the presence of boron trifluoride as catalyst to produce substantial amounts of a para-C-alkylated thiophenol.

12. The process for preparing para-t-butylated thiophenols which comprises reacting a t-butyl alkaryl sulfide in which the alkaryl radical is mononuclear and contains hydrogen atoms in meta and para positions in the presence of boron trifluoride as catalyst to produce substantial amounts of a para-C-t-butylated thiophenol.

13. The process for preparing para-t-butylated thiophenols which comprises reacting a t-butyl alkaryl sulfide in which the alkaryl radical is mononuclear and contains hydrogen atoms in meta and para positions with a thio phenol containing hydrogen atoms in meta and para positions in the presence of boron trifluoride as catalyst to produce substantial amounts of a para-C-t-butylated thiophenol.

14. The process for preparing para-t-butylated thiophenols which comprises reacting a mononuclear t-butyl p-t-butylaryl sulfide and a mononuclear thiophenol containing hydrogen atoms in meta and para positions in the presence of boron trifluoride as catalyst to produce substantial amounts of a para-C-t-butylated thiophenol.

15. The process for preparing p-t-butylthiophenol from t-butyl phenyl sulfide which comprises reacting t-butyl phenyl sulfide and thiophenol in the presence of boron trifluoride as catalyst to produce substantial amounts of p-t-butylthiophenol.

16. The process for preparing 4-t-butyl-o-thiocresol which comprises reacting o-thiocresol with isobutylene in the presence of boron trifluoride as catalyst so that substantial t-butylation in the para position occurs.

17. The process for preparing 4-t-butyl-2,6-thioxylenol which comprises reacting 2,6-thioxylenol with isobutylene in the presence of boron trifluoride as catalyst so that substantial t-butylation in the para position occurs.

18. The process for preparing p-t-butylthiophenol from t-butyl p-t-butylphenyl sulfide which comprises reacting t-butyl p-t-butylphenyl sulfide and thiophenol in the presence of boron trifluoride as catalyst to produce substantial amounts of p-t-butylthiophenol.

19. The process for preparing t-alkyl p-t-alkaryl sulfide in substantial amounts by direct alkylation of a thiophenol which comprises reacting a thiophenol containing hydrogen atoms in meta and para positions with a molar excess of a t-alkyl-generating olefinic hydrocarbon containing from 4 to 12 carbon atoms in the presence of boron trifluoride as catalyst.

20. The process for preparing t-butyl p-t-butylphenyl sulfide in substantial amounts by direct butylation of thiophenol which comprises reacting thiophenol with a molar excess of isobutylene in the presence of boron trifluoride as catalyst.

21. The process for preparing p-nonylthiophenol which comprises reacting nonyl phenyl sulfide with thiophenol in the presence of boron trifluoride as catalyst to produce substantial amounts of p-nonylthiophenol.

22. t-Alkyl para-t-alkaryl sulfide.

23. t-Butyl para-t-butylphenyl sulfide.

24. Nonyl para-nonylphenyl sulfide.

25. The process of substituting the hydrogen atom in the para position of a thiophenol by a tertiary alkyl group which comprises alkylating an alkylatable thiophenol containing hydrogen atoms in meta and para positions with a monoolefinic hydrocarbon containing from 4 to 12 carbon atoms, and in which the alkyl substituent formed is a tertiary alkyl group, in the presence of boron trifluoride as catalyst at ring alkylating conditions so that there occurs substantial substitution by the tertiary alkyl group in the para position.

26. The process of substituting the hydrogen atom in the para position of a thiophenol by a tertiary alkyl group which comprises alkylating a thiophenol selected from the class consisting of thiophenol and ortho-lower alkyl-substituted thiophenols with a monoolefinic hydrocarbon containing from 4 to 12 carbon atoms, and in which the alkyl substituent formed is a tertiary alkyl group, in the presence of boron trifluoride as catalyst at ring alkylating conditions so that there occurs substantial substitution by the tertiary alkyl group in the para position.

(References on following page)

References Cited in the file of this patent

UNITED STATES PATENTS

| | | |
|---|---|---|
| 2,686,815 | Nickels | Aug. 17, 1954 |
| 2,688,001 | Echols | Aug. 31, 1954 |
| 2,739,172 | Peters | Mar. 20, 1956 |
| 2,753,378 | Kruz | July 3, 1956 |
| 2,775,568 | Lober et al. | Dec. 25, 1956 |
| 2,784,167 | Schneider et al. | Mar. 5, 1957 |
| 2,800,451 | Mottern et al. | July 23, 1957 |
| 2,810,765 | Neuworth et al. | Oct. 22, 1957 |
| 2,843,465 | Yust et al. | July 15, 1958 |
| 2,949,487 | Rocklin | Aug. 16, 1960 |

OTHER REFERENCES

Bartkus et al.: J. Org. Chem. 25, 232–233 (1960).

Chemical Abstracts, vol. 52, Subject Index, pp. 2869S, col. 2.

UNITED STATES PATENT OFFICE
CERTIFICATE OF CORRECTION

Patent No. 3,084,198                          April 2, 1963

Martin B. Neuworth et al.

It is hereby certified that error appears in the above numbered patent requiring correction and that the said Letters Patent should read as corrected below.

Column 5, lines 38 to 44, the right-hand formula should appear as shown below instead of as in the patent:

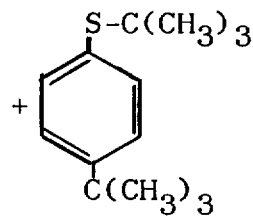

column 9, line 19, for "+C(CH$_3$)$_2$-CH$_2$" read -- +C(CH$_3$)$_2$=CH$_2$ --; column 11, line 26, strike out "hydrogen atoms in meta and para position with a thio-".

Signed and sealed this 29th day of October 1963.

(SEAL)
Attest:
ERNEST W. SWIDER
Attesting Officer

EDWIN L. REYNOLDS

Acting Commissioner of Patents